United States Patent
Levine et al.

(10) Patent No.: US 6,311,325 B1
(45) Date of Patent: Oct. 30, 2001

(54) METHOD AND APPARATUS FOR PROFILING PROCESSES IN A DATA PROCESSING SYSTEM BACKGROUND OF THE INVENTION

(75) Inventors: Frank Eliot Levine; Robert Francis Berry, both of Austin; Chester Charles John, Jr, Round Rock; Riaz Yousuf Hussain, Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/177,031

(22) Filed: Oct. 22, 1998

(51) Int. Cl.$^7$ ...................................................... G06F 9/45
(52) U.S. Cl. .................................................. 717/4; 714/45
(58) Field of Search ................................. 717/4; 714/45, 714/38; 702/179, 183, 187, 224; 709/224

(56) References Cited

U.S. PATENT DOCUMENTS

| | | | |
|---|---|---|---|
| 5,047,919 | 9/1991 | Sterling et al. | 364/200 |
| 5,355,487 | 10/1994 | Keller et al. | 395/650 |
| 5,613,118 | 3/1997 | Heisch et al. | 395/709 |
| 5,768,500 | 6/1998 | Agrawal et al. | 395/184 |
| 5,774,724 * | 6/1998 | Heisch | 717/4 |
| 5,896,535 * | 4/1999 | Ronstrom | 717/1 |
| 5,953,529 * | 9/1999 | Kato | 717/4 |
| 5,978,937 * | 11/1999 | Miyamori et al. | 714/45 |
| 6,002,872 * | 12/1999 | Alexander, III et al. | 717/4 |

OTHER PUBLICATIONS

Liang et al. Dynamic Class Loading in the Java Virtual Machine. ACM. pp. 36–44, Oct. 1998.*

International Business Machines; Data Structure and Insertion Algorithm for Representing Asynchronous Occurrences for Visualization by Trace Visualization Tools Using Ghant Charts with Occurance Hierarachies; Jul. 1993; pp. 547–557; IBM Technical Disclosure Bulletin; vol. 36, No. 07.

International Business Machines; Adaptive Trace–Directed Program Restructuring; Feb. 1994; pp. 115–116; IBM Technical Disclosure Bulletin; vol. 37, No. 02B.

Curry, TW.; Profiling and Tracing Dynamic Library Usage Via Interposition; 1994; pp. 267–278; Proceedings of the Summer 1994 USENIX Conference.

International Business Machine; Application of Interpreter for Debugging Functions; Sep. 1993; pp. 67–68; IBM Technical Disclosure Bulletin; vol. 36 No. 09B.

* cited by examiner

Primary Examiner—Kakali Chaki
Assistant Examiner—Wei Zhen

(57) ABSTRACT

A method and apparatus in a data processing system for profiling code for processes executing in a data processing system. Trace data is recorded in response to a selected interrupt, wherein the trace data includes an indication of which code is being interrupted. The trace data is processed to identify whether the interrupted code is interpreted code.

21 Claims, 7 Drawing Sheets

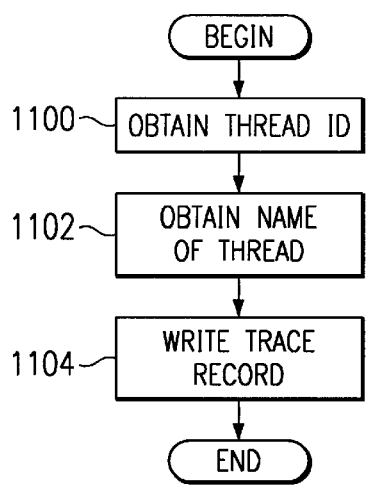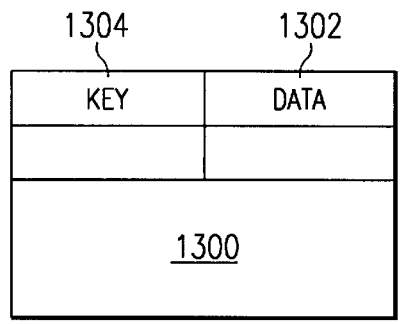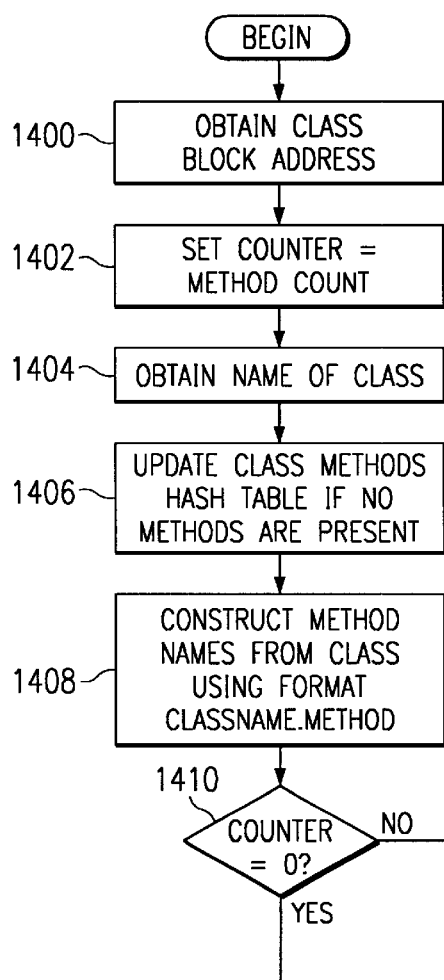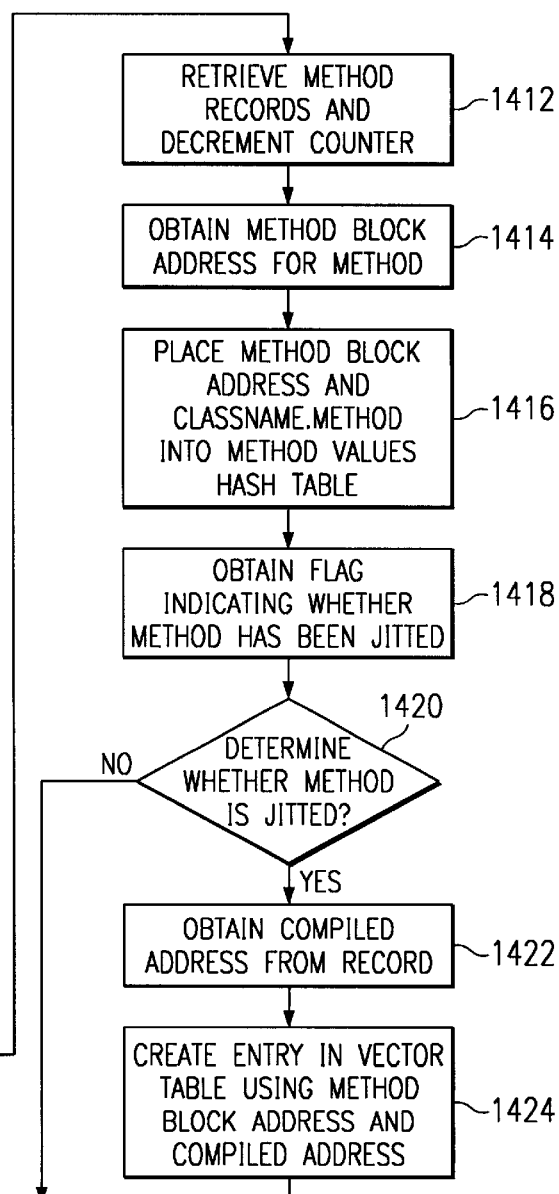
FIG. 11
FIG. 13
FIG. 14

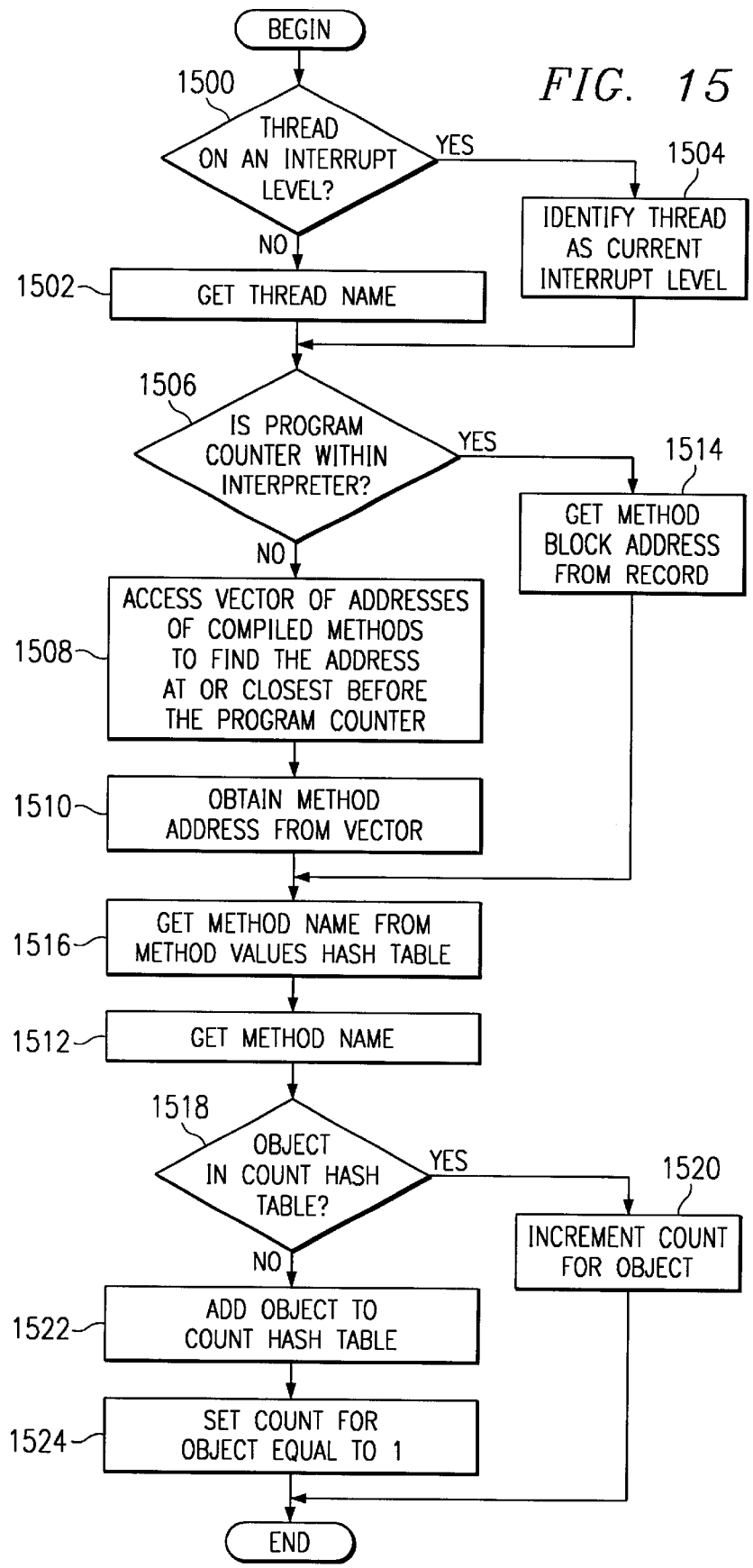

METHOD AND APPARATUS FOR PROFILING PROCESSES IN A DATA PROCESSING SYSTEM BACKGROUND OF THE INVENTION

BACKGROUND OF THE INVENTION

1. Technical Field

The present invention relates to an improved data processing system and in particular to a method and apparatus for optimizing performance in a data processing system. Still more particularly, the present invention provides a method and apparatus for profiling performance in a data processing system.

2. Description of Related Art

In order to improve performance of code generated by various families of computers, it is often necessary to determine where time is being spent by the processor in executing code, such efforts being commonly known in the computer processing arts as locating "hot spots". Ideally one would like to isolate such hot spots at the instruction and/or source line of code level in order to focus attention on areas which might benefit most from improvements to the code.

For example, isolating such hot spots to the instruction level permits compiler writers to find significant areas of suboptimal code generation, whereby they may thus focus their efforts to improve code generation efficiency in these areas. Another potential important use of instruction level detail is to provide guidance to the designer of future systems. Such designers with appropriate profiling tools may find characteristic code sequences and/or single instructions requiring improvement to optimize the available hardware for a given level of hardware technology.

In a like manner, isolating hot spots to the source line of code level would provide the level of detail necessary for an application developer to make algorithmic tradeoffs. A programmer's a priori guesses about where a program is spending significant time executing are frequently wrong for numerous reasons. First, the programmer seldom has a comprehensive understanding of the complex dynamics of the hardware and software system. Secondly, the compiler itself often does not generate code that corresponds to the programmer's assumptions. It was accordingly highly desirable to provide a system for feeding back information to the programmer about the execution dynamics of a program in terms that the programmer could easily understand. Various methods are present for monitoring aggregate CPU usage known as "profiling", for example, U.S. Pat. No. 5,355,487, System and Method for Computer System Profiling and "Technique for Speculatively Sampling Performance Parameters," IBM Tech. Disclosure Bull., No. 9, 589–592 (September 1994).

With the increasing use of the Internet by many businesses and individual users, Java has become an increasingly common system in which applications are disseminated. Java is an object oriented programming language and environment focusing on defining data as objects and the methods that may be applied to those objects.

The Java virtual machine (JVM) is the name of a virtual computer component that actually executes Java programs. Java programs are not run directly by the central processor, but instead by the JVM, which is itself a piece of software running on the processor. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run-time system. The Java compiler generates bytecode instructions that are non-specific to a particular computer architecture. A bytecode is a machine independent code generated by the Java compiler and executed by a Java interpreter. A Java interpreter is part of the JVM that alternately decodes and interprets a bytecode or bytecodes. These bytecode instructions are designed to be easy to interpret on any computer and easily translated on the fly into native machine code. Byte codes are typically translated into native code by a just-in-time compiler or JIT.

A need has arisen with operating systems that provide implementation of the JVM to take non-invasive snapshots of these Java environments to allow for identification of various processes executing within that Java environment.

Therefore, it would be advantageous to have a method and apparatus for profiling data processing systems having Java environments.

SUMMARY OF THE INVENTION

The present invention provides a method and apparatus in a data processing system for profiling code for processes executing in a data processing system. Trace data is recorded in response to a selected interrupt, wherein the trace data includes an indication of which code is being interrupted. The trace data is processed to identify whether the interrupted code is interpreted or native code.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 11 is a flowchart of a process used by a hook that executes when a thread is initialized in accordance with a preferred embodiment of the present invention;

FIG. 13 is a diagram of a hash table in accordance with a preferred embodiment of the present invention;

FIG. 14 is a flowchart of a process for class and method processing in accordance with a preferred embodiment of the present invention; and FIG. 15 is a flowchart of a process for thread record processing in accordance with a preferred embodiment of the present invention.

DETAILED DESCRIPTION OF THE PREFERRED EMBODIMENT

Figure 1:
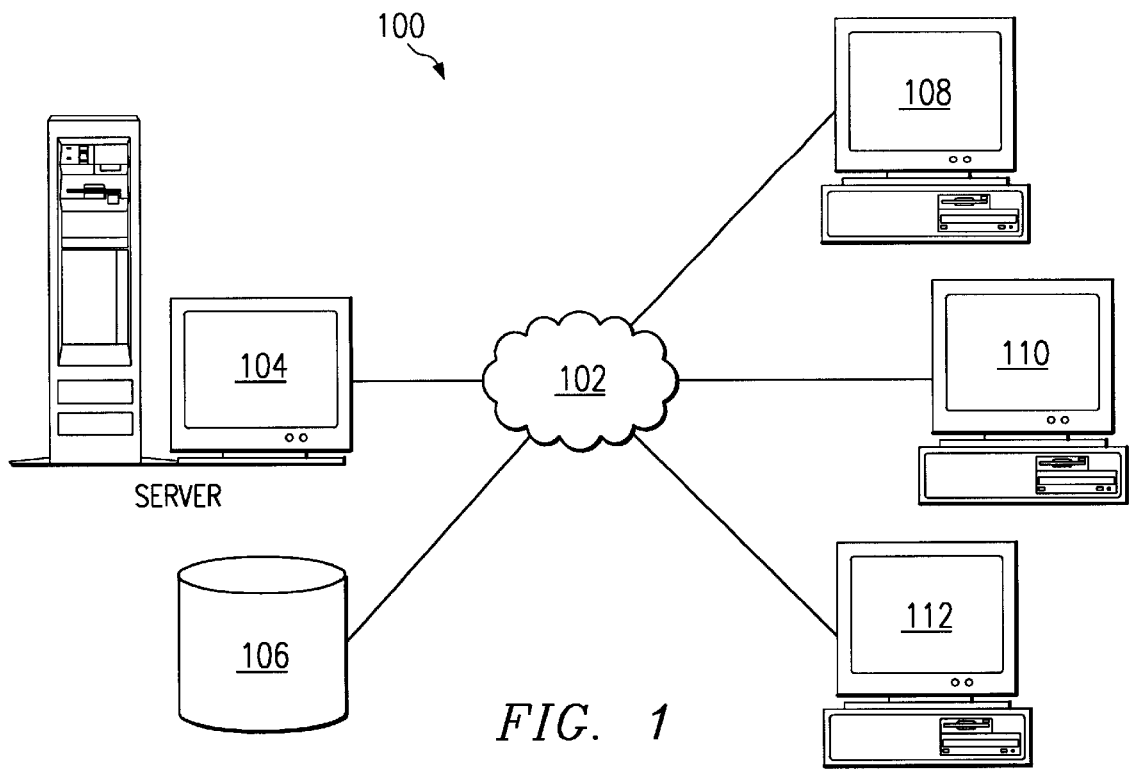
FIG. 1 is a pictorial representation of a distributed data processing system in which the present invention may be implemented.

With reference now to the figures, and in particular with reference to FIG. 1, a pictorial representation of a distributed data processing system in which the present invention may be implemented is depicted.

Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, distributed data processing system 100 also may be implemented as a number of different types of networks, such as, for example, an Intranet or a local area network.

FIG. 1 is intended as an example, and not as an architectural limitation for the processes of the present invention.

Figure 2:
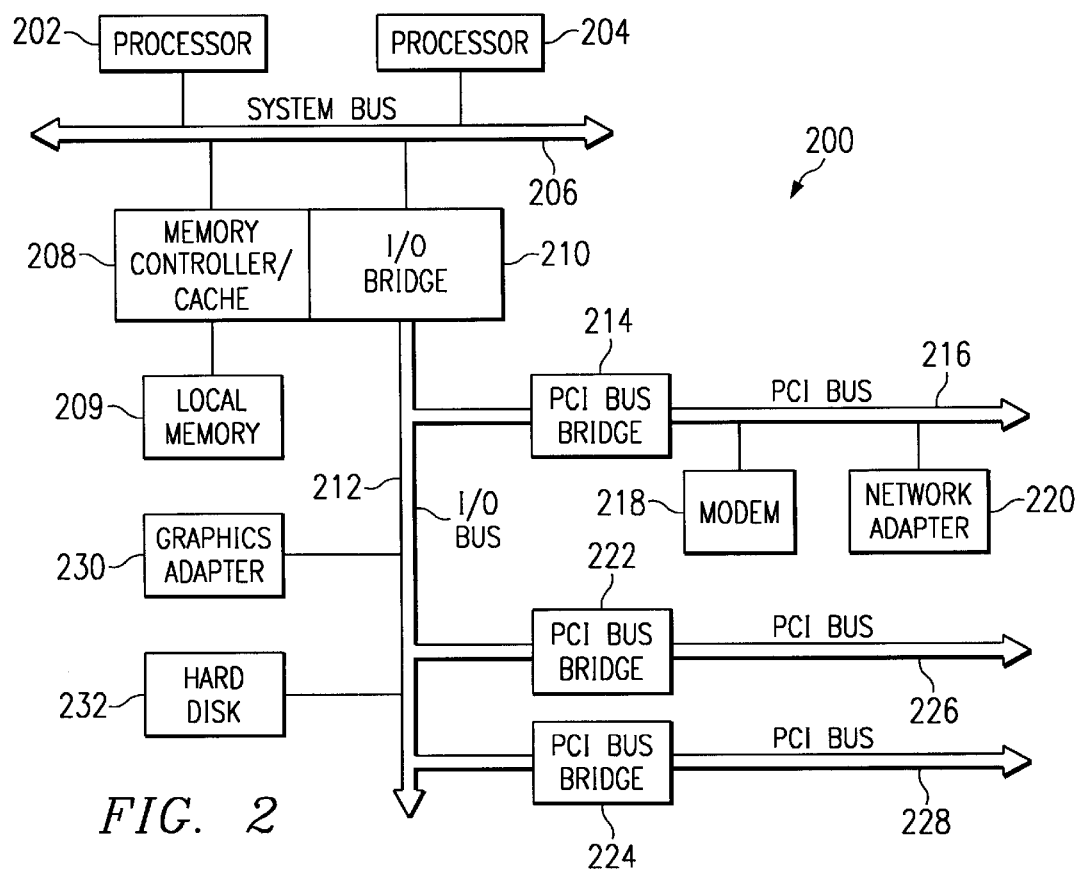
FIG. 2 is a block diagram of a data processing system which may be implemented as a server in accordance to the present invention.

Referring to FIG. 2, a block diagram of a data processing system which may be implemented as a server, such as server 104 in FIG. 1, is depicted in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems 218–220 may be connected to PCI local bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drive and the like also may be used in addition or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
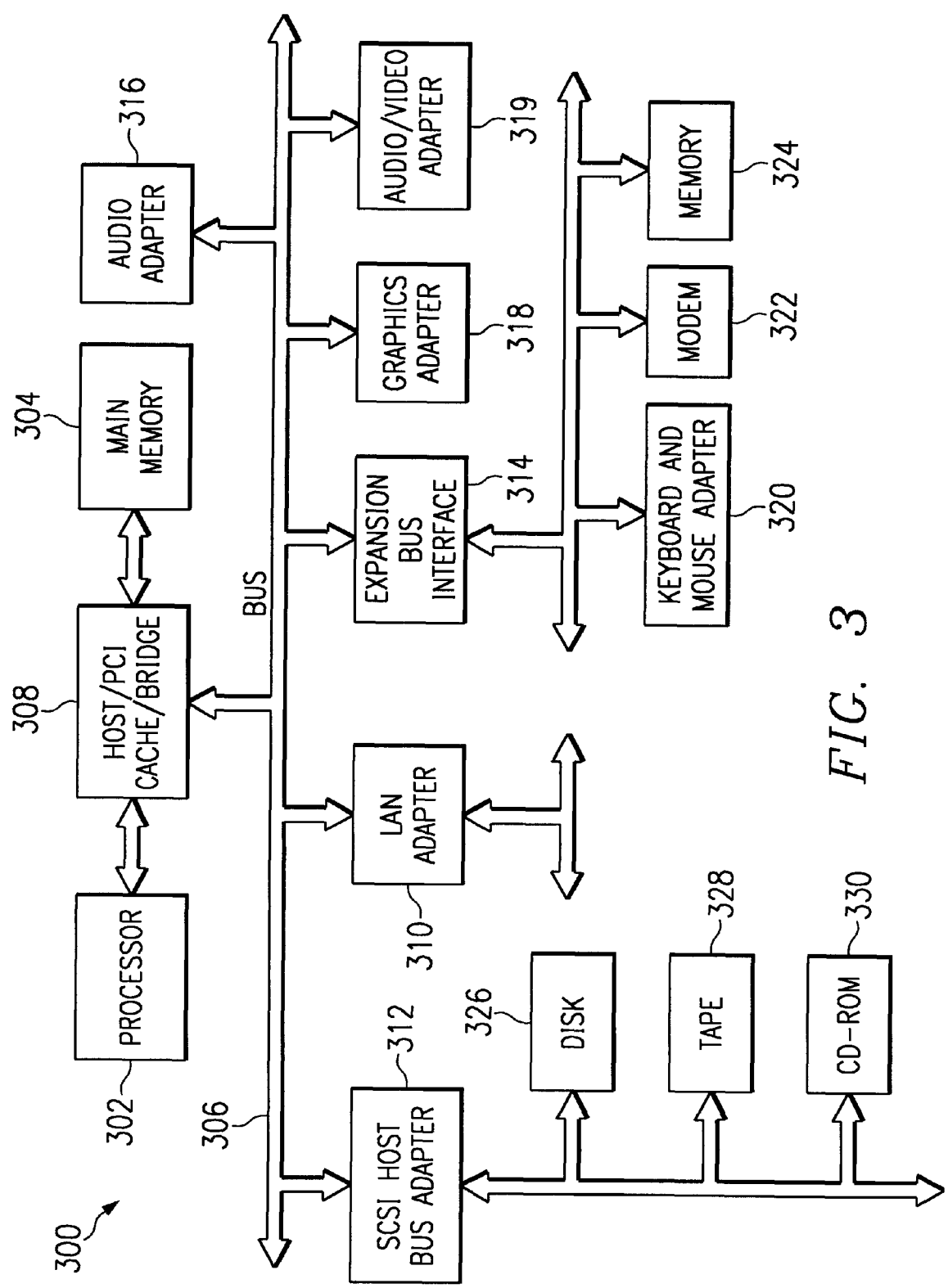
FIG. 3 is a block diagram of a data processing system in which the present invention may be implemented.

With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM 330 in the depicted example. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as Java OS or OS/2, which are available from International Business Machines Corporation. An object oriented programming system such as Java may run in conjunction with the operating system and provides calls to the operating system from Java programs or applications executing on data processing system 300. Instructions for the operating system, the object-oriented operating system, and applications or programs are located on storage devices, such as hard disk drive 326 and may be loaded into main memory 304 for execution by processor 302. Often times, hard disk drives are absent and memory is constrained when data processing system 300 is used as a network client.

Those of ordinary skill in the art will appreciate that the hardware in FIG. 3 may vary depending on the implementation. For example, other peripheral devices, such as optical disk drives and the like may be used in addition to or in place of the hardware depicted in FIG. 3. The depicted example is not meant to imply architectural limitations with respect to the present invention. For example, the processes of the present invention may be applied to multiprocessor data processing system.

Figure 4:
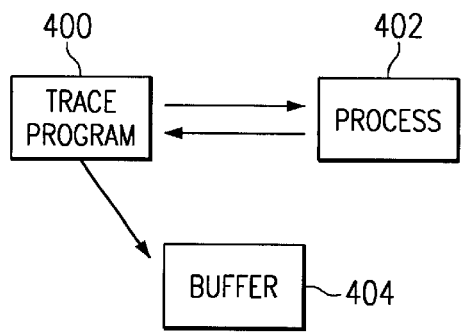
FIG. 4 is a block diagram of components used to profile processes in a data processing system in accordance with a preferred embodiment of the present invention.

Turning now to FIG. 4, a block diagram of components used to profile processes in a data processing system is depicted in accordance with a preferred embodiment of the present invention. A trace program 400, also referred to as Java time profiler, is used to profile processes 402. Trace program 400 may be used to record data upon the execution of a hook, which is a specialized piece of code at a specific location in a routine or program in which other routines may be connected. Trace hooks are typically inserted for the purpose of debugging performance analysis, or enhancing functionality. These trace hooks are employed to send trace data to trace program 400, which stores the trace data in buffer 404. The trace data in buffer 404 may be stored in a file for post processing. With Java operating systems, the present invention employs trace hooks that aid in identifying interpreted methods that may be used in processes 402. In addition, since classes may be loaded and unloaded, these changes also are identified using trace data in accordance with a preferred embodiment of the present invention. This is especially relevant with "network client" data processing systems, such as Java OS since classes and jitted methods may be loaded and unloaded more frequently due to the constrained memory and role as a network client.

Figure 5:
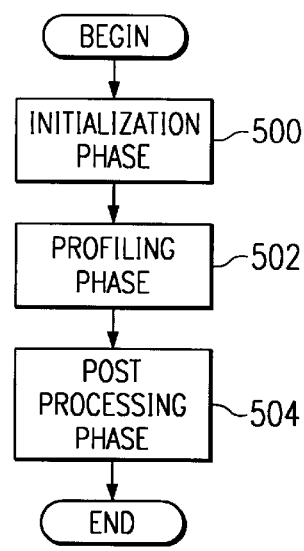
FIG. 5 is a diagram illustrating various phases in profiling processes in accordance with a preferred embodiment of the present invention.

With reference now to FIG. 5, a diagram illustrating various phases in profiling the processes active in an operating system is depicted in accordance with a preferred embodiment of the present invention. In profiling processes, an initialization phase 500 is used to capture the state of the client machine at the time tracing is initiated. This trace initialization data includes trace records that identify all existing threads, all loaded classes, and all methods for the loaded classes. Records from trace data captured from hooks are written to indicate thread switches, interrupts, and loading and unloading of classes and jitted methods. In accordance with a preferred embodiment of the present invention, any class which is loaded has trace records that indicate the name of the class and its methods. In the depicted example, four bytes are used to indicate threads, classes, and methods. These IDs are associated with names put out in the records. A record is written to indicate when all of the start up information has been written. Next, during profiling phase 502, each time the system timer interrupt occurs, a trace record is written, which indicates the system program counter. This system program counter may be used to identify the routine that is interrupted. In addition, at this time, a determination is made as to whether the code being interrupted is being interpreted by the Java interpreter. If the code being interrupted is interpreted, the method ID of the method being interpreted is also placed in the trace record. In the depicted example, a timer interrupt is used to initiate gathering of trace data. Of course, other types of interrupts may be used other than timer interrupts. Interrupts based on a programmed performance monitor event or other types of periodic events may be employed.

In post processing phase 504, the data collected in the buffer is sent to a file for post processing. In the depicted example, the file is sent to a server, which determines the profile for the time spent by all of the processes on the client machine. Of course, the post processing also may be performed on the client machine depending on available resources. In post processing phase 504, hash tables are employed to maintain names associated with IDs. A hash table employs hashing to convert an identifier or a key, meaningful to a user, into a value for the location of the corresponding data in the table. While processing trace records, the hash tables are updated to reflect the current state of the client machine, including newly loaded JITed code or unloaded code. Also, in post processing phase 504, each trace record is processed in a serial manner. As soon as the indicator that all of the start up information is processed, timer interrupt records are then processed. Timer interrupt information from the timer interrupt records are resolved with existing hash tables. In addition, this information identifies the thread and function being executed. The data is stored in hash tables with a count identifying the number of timer tick occurrences associated with each way of looking at the data. After all of the trace records are processed, the information is formatted for output in the form of a report.

Figure 6:
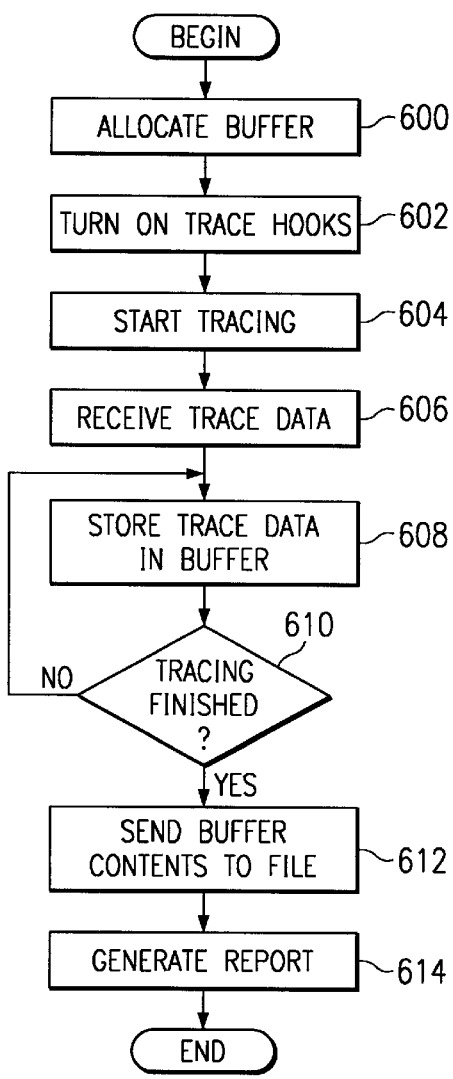
FIG. 6 is a flowchart of a process used by a trace program for recording and managing trace records from processes executing on a data processing system in accordance with a preferred embodiment of the present invention.

With reference now to FIG. 6, a flowchart of a process used by a trace program for generating trace records from processes executing on a data processing system is depicted in accordance with a preferred embodiment of the present invention. Trace records are produced by the execution of small pieces of code called "hooks". Hooks may be inserted in various ways into the code executed by processes, including statistically (source code) and dynamically (through modification of a loaded executable). This process is employed after trace hooks have already been inserted into the process or processes of interest. The process begins by allocating a buffer (step 600), such as buffer 404 in FIG. 4. Next, in the depicted example, trace hooks are turned on (step 602), and tracing of the processes on the system begins (step 604). Trace data is received from the processes of interest (step 606). This trace data is stored as trace records in the buffer (step 608). A determination is made as to whether tracing has finished (step 610). Tracing finishes when the trace buffer filled or the user stops tracing via a command and requests that the buffer contents be sent to file. If tracing has not finished, the process returns to step 602 as described above.

Otherwise, the buffer contents are sent to a file for post processing (step 612). A report is then generated in post processing (step 614) with the process terminating thereafter.

Although the depicted example uses post processing to analyze the trace records, the processes of the present invention may be used to process trace information in real time depending on the implementation.

Figure 7:
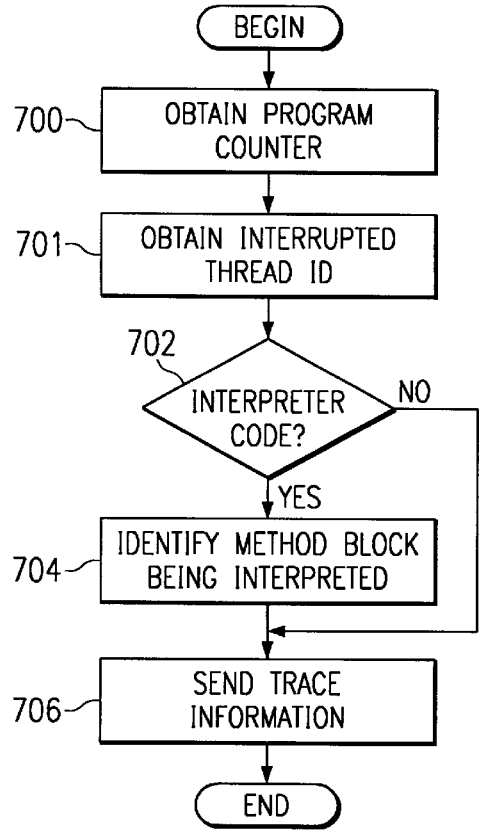
FIG. 7 is a flowchart of a process used by a hook (event trace instrumentation) placed in the interrupt handler in accordance with a preferred embodiment of the present invention.

With reference now to FIG. 7, a flowchart of a process used in system interrupt handler trace hook is depicted in accordance with a preferred embodiment of the present invention.

The process begins by obtaining a program counter (step 700). Typically, the program counter is available in one of the saved program stack areas. Thereafter, a determination is made as to whether the code being interrupted is interpreted code (step 702). This determination may be made by determining whether the program counter is within an address range for the interpreter used to interpret bytecodes. If the code being interrupted is interpreted, a method block address is obtained for the code being interpreted. A trace record is then written (step 706). The trace record is written by sending the trace information to a trace program, such as trace program 400, which generates trace records for post processing in the depicted example. This trace record is referred to as an interrupt record, or an interrupt hook.

Figure 8:
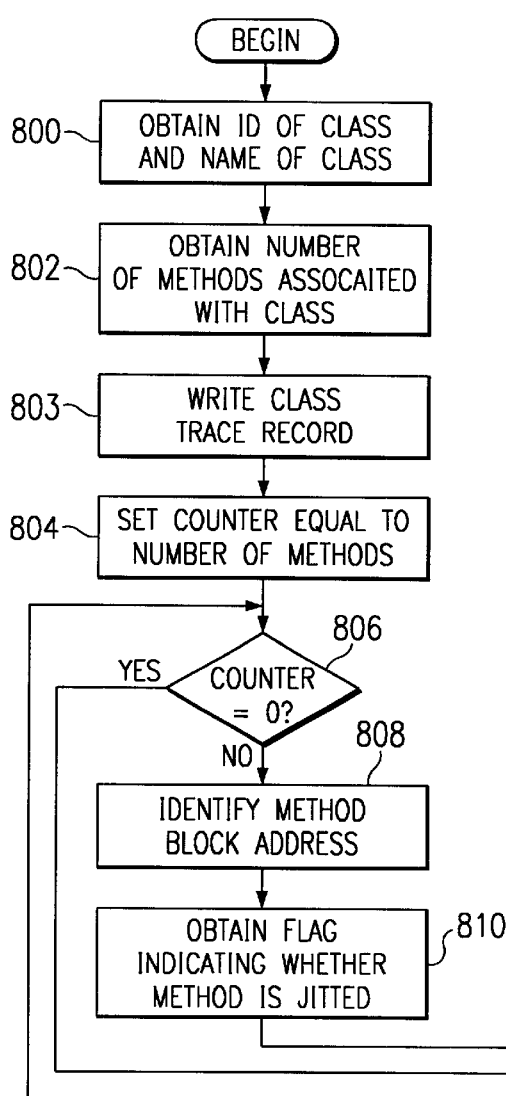
FIG. 8 is a flowchart of a process used to generate trace data during the initialization phase and each time a class is loaded in accordance with a preferred embodiment of the present invention.
Figure 8:
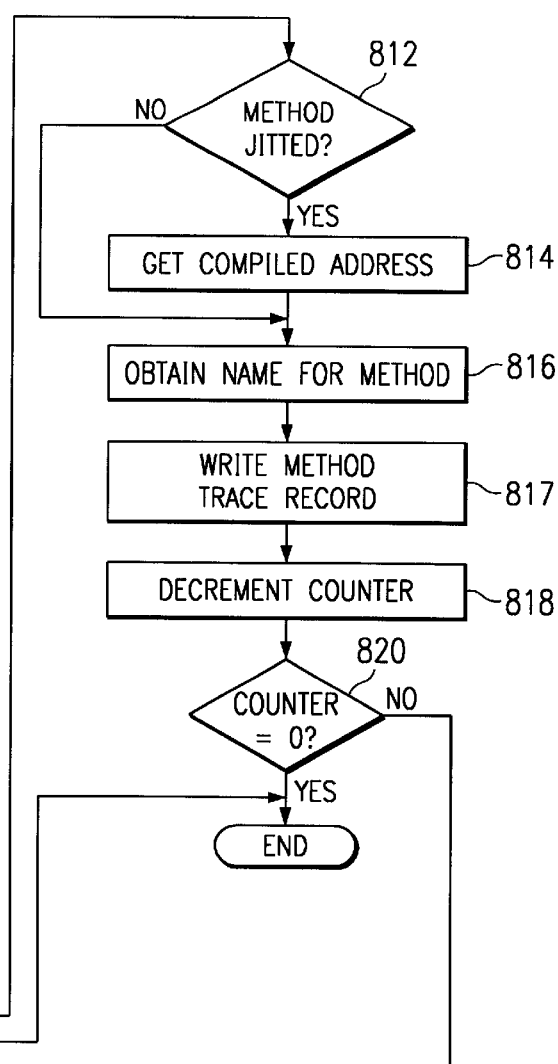

Turning now to FIG. 8, a flowchart of a process used to generate trace data during the initialization phase and each time a class is loaded by the JVM is illustrated in accordance with a preferred embodiment of the present invention. This process is employed during the initialization phase for each class that is loaded. In addition, the steps in FIG. 8 also are used each time a class is loaded during profiling or tracing of processes.

The process begins by obtaining the identification of the class and the name of the class (step 800). Then, the number of methods associated with the class are obtained (step 802). A class trace record is then written using the information (step 803). This information includes a trace record indicating the class block address and number of methods. A counter is set equal to the number of methods (step 804). Next, a determination is made as to whether the counter is equal to zero (step 806). If the counter is equal to zero, the process terminates thereafter. If the counter is non-zero, then a trace record is written for each method as follows. A method block address is identified for the next method (step 808). A flag is obtained that indicates whether the method is jitted (step 810). This flag may be obtained from a table used in a Java virtual machine. A method has been "jitted" when the bytecodes for the method have been compiled into native machine language instructions for use on the client data processing system on which the method is to be executed. The address at which the jitted code is located is the compiled address.

Then, a determination is made as to whether a compiled address is present (step 812). This determination is made by examining the flag obtained in (step 810). If a compiled address is present, the compiled address is retrieved from the JITS table (step 814). Then a name is obtained for the method (step 816). The process proceeds directly to this step from step 812, a compiled address is not present. A trace record indicating the method information, such as, the method block address, flags, jitted address, and method name, is written (step 817).

Thereafter, the counter is decremented (step 818), and a determination is made as to whether the counter is equal to zero (step 820). If the counter is equal to zero, the process terminates. The trace records are startup records if the process was used during the initialization phase. If the process is employed during the loading of a class, the record is a load class and/or method records. The process will then terminate because all of the methods associated with the class will have been processed. On the other hand, if the counter is not equal to zero, the process will return to step 806.

Figure 9:
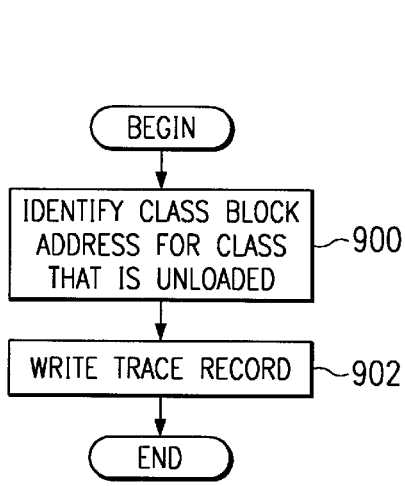
FIG. 9 is a flowchart of a process used by a hook that executes when a class is unloaded.

Next, FIG. 9 is a flowchart of a process used by a trace hook that reports when a class is unloaded. This process is employed each time a class is unloaded. The process begins by identifying the class block address for the class that is unloaded (step 900). Then, a trace record is written (step 902) with the process terminating thereafter. The record is a class unload record.

Figure 10A:
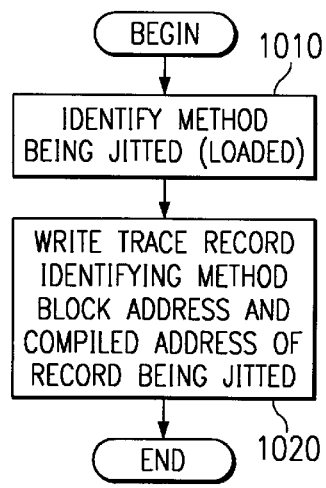
FIGS. 10A and 10B are flowcharts of a process used by a hook that executes when a method is unloaded in accordance with a preferred embodiment of the present invention.

In FIG. 10A, a flowchart of a process used when a method is loaded is depicted in accordance with a preferred embodiment of the present invention. The process begins by identifying the method being JITed (loaded) (step 1010), and writes a trace record identifying the method block address and compiled address of the record being JITed (step 1020). Thereafter, the process terminates.

Figure 10B:
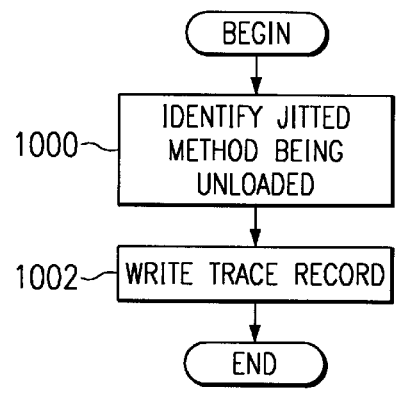

In FIG. 10B, a flowchart of a process used when a method is unloaded is depicted in accordance with a preferred embodiment of the present invention. The process identifies the method being unloaded (step 1000), and writes a trace record (step 1002) with the process terminating thereafter. Either the method block address or the compiled address may be used to identify the method.

With reference now to FIG. 11, a flowchart of a process used by a trace hook that reports when a thread is initialized is depicted in accordance with a preferred embodiment of the present invention. The process begins by obtaining a thread ID for the thread being initialized (step 1100). Then, the name of the thread is obtained (step 1102). A trace record is then written (step 1104) with the process terminating thereafter.

Figure 12:
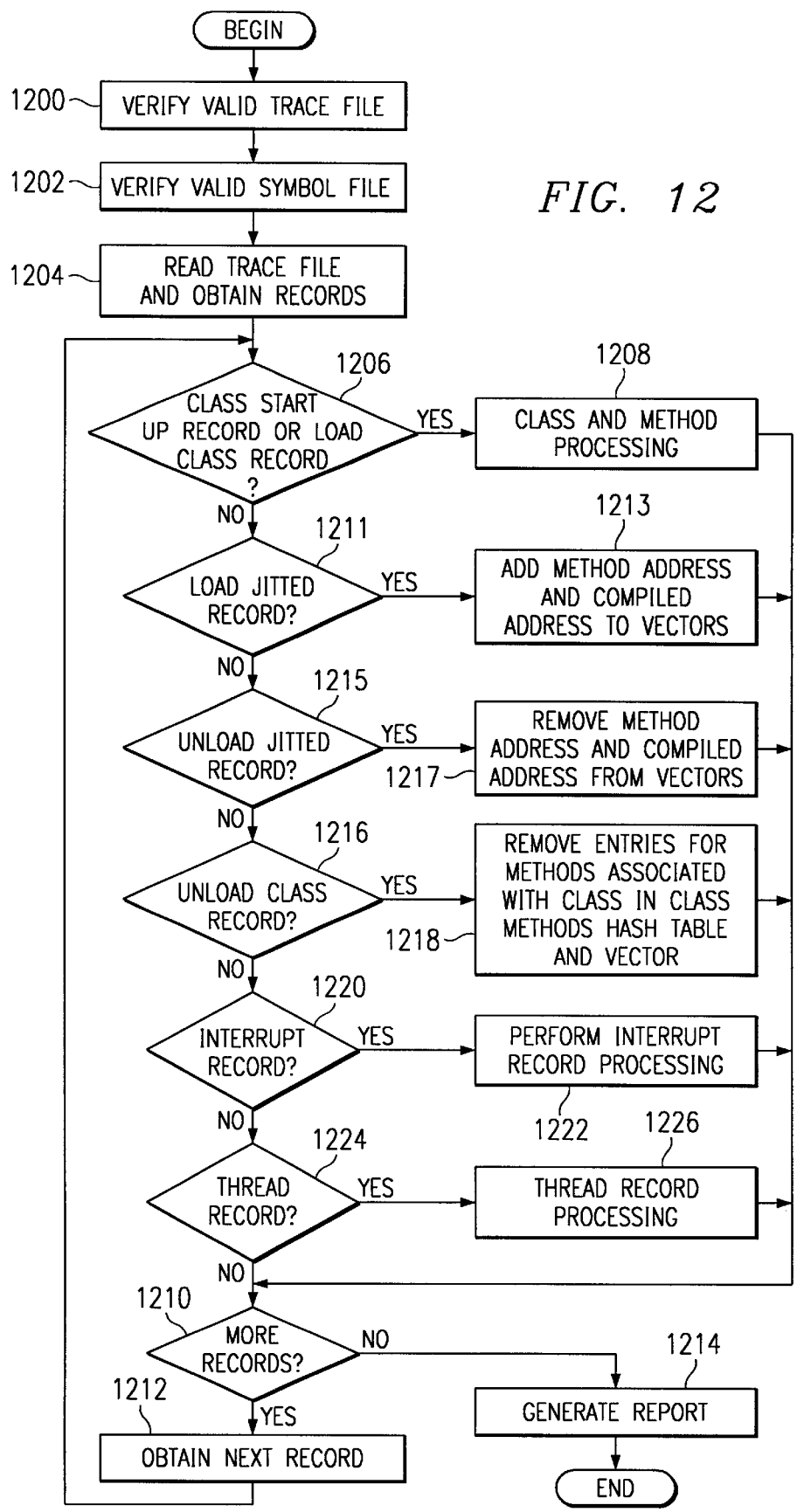
FIG. 12 is a flowchart of a process for processing trace records in accordance with a preferred embodiment of the present invention.

Turning next to FIG. 12, a flowchart of a process for processing trace records is depicted in accordance with a preferred embodiment of the present invention. The process begins by determining whether a valid trace file is present (step 1200). If a valid trace file is not present, the process terminates. Otherwise, a determination is made as to whether a valid symbol file is present (step 1202). The process also terminates if a valid symbol file is not present. If the symbol file is valid, the trace file is read to obtain trace records for processing (step 1204).

A determination is made as to whether the trace record is a startup record or a load class record (step 1206). If the record is a startup record or a load class record, class and method processing is employed (step 1208) with the process then determining whether additional records are present for processing (step 1210). Step 1208 is described in more detail in FIG. 14 below. If more records are present, the process obtains the next record for processing (step 1212) and returns to step 1206. Otherwise, a report is generated (step 1214) with the process terminating thereafter.

With reference again to step 1206, if the trace record is not a class startup record or a load class record, the process determines whether the trace record is a load jitted record (step 1211). If the trace record is a load jitted record, the process adds method address and compiled address to vectors (step 1213) and proceeds to step 1210 as described above. Otherwise, the process determines if the trace record is an unload jitted record (step 1215). If the trace record is an unload jitted record, the process removes the method address and compiled address from vectors (step 1217) and proceeds to step 1210 as described above. Otherwise, the process determines whether the trace record is an unload class record (step 1216). If the trace record is an unload class record, the process then removes entries for methods associated with the class in a class methods hash table and the vector (step 1218) with the process then proceeding to step 1210 as described above.

Referring again to step 1216, if the trace record is not an unload class record, a determination is then made as to whether the trace record is an interrupt record (step 1220).

If the trace record is an interrupt record, the interrupt record is processed (step 1222) with the process then returning to step 1210. On the other hand, if the trace record is not an interrupt record, a determination is made as to whether the trace record is a thread record (step 1224). If the trace record is a thread record, then thread processing is performed (step 1226) with the process then proceeding to step 1210, as described above. The thread records may include a thread switch record, which identifies current thread ID for the trace record. In addition, thread records may include a thread start record. For each thread ID a trace record is written indicating the thread ID and its name. If the trace record is not a thread record, the process also proceeds to step 1210. If no more records are present, a report is generated (step 1214) and the process terminates.

With reference now to FIG. 13, a diagram of a hash table is depicted in accordance with a preferred embodiment of the present invention. Hash table 1300 includes a data 1302, which is accessed using a key 1304. Key 1304 is converted using hashing into a value for the location of data 1302 within hash table 1300. Hash table 1300 is an example of a hash table that may be used to implement the class methods hash table in step 1218 in FIG. 12. A vector is similar to a hash table except that a vector identifies an ordered relationship between vector elements.

Turning now to FIG. 14, a flowchart of a process for class and method processing is depicted in accordance with a preferred embodiment of the present invention. This figure is a more detailed diagram of step 1208 in FIG. 12. The process begins by obtaining the class block address from the class record (step 1400). Then, a method count is obtained, and the counter is set equal to the method count (step 1402), and the name of the class is obtained (step 1404). The information in steps 1402 and 1404 are obtained form the trace records. A class method hash table is updated if new methods are present when the method count is obtained in step 1402 (step 1406). Method names are constructed from the class identification in the record (step 1408). A determination is made as to whether the counter is equal to zero (step 1410). If the counter is equal to zero, the process terminates. Otherwise, the next method is retrieved from the trace record and the counter is decremented (step 1412). Information for each method is located in a separate trace record. A method block address is obtained for the method in the method record (step 1414). Information about the method is placed in a method values hash table with the method block address used as a key with a string consisting of the ClassName.MethodName plus a signature used as the object or data in the hash table (step 1416). Then, a flag is obtained from the record to determine whether the method has been jitted (step 1418). A determination is made as to whether the method is jitted (step 1420). If the method is jitted, the compiled address is obtained from the trace record (step 1422). Then, an entry is created in the vector table using the method block address as the key and the compiled address as the object or data referenced by the key (step 1424) with the process terminating thereafter. The process also terminates from step 1420 if the method is not jitted.

With reference now to FIG. 15, a flowchart of a process for thread record processing is depicted in accordance with a preferred embodiment of the present invention. FIG. 15 is a more detailed description of step 1220 in FIG. 12. The process begins by determining whether the thread is on an interrupt level (step 1500). If the thread is not on an interrupt level, the process obtains the thread name (step 1502). If the thread is on an interrupt level, the thread is identified as the current interrupt level (step 1504). In either case, a determination is then made as to whether or not the program counter is within the interpreter (step 1506). If the program counter is not within the interpreter, the vector of addresses for compiled methods is accessed to find the address closest to the thread address (step 1508). The address for the method closest to the thread address is the one that is associated with the thread when the program counter is within the interpreter. Thereafter, a method address is obtained from the vector (step 1510). Then, the method name is obtained from the hash table (step 1516). For each method, an entry is made in vectors indicating the method address and the compiled address for zero to indicate no compiled address. With reference again to step 1506, if the program counter is within the interpreter, the process then obtains the method block address from the record (step 1514). Thereafter, the method name is obtained from the method values hash table (step 1516) with the process then obtaining the method name (step 1512).

Thereafter, a determination is made as to whether the method and/or thread/method, also referred to as an object, is present, in the count hash table. If the object is present, the count for the object is incremented (step 1520) with the process terminating thereafter. Otherwise, the object is added to the count hash table (step 1522), and the count for the object is set equal to one (step 1524) with the process terminating thereafter. The object may be, for example, a method or thread concatenated with the method name.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. For example, the present invention may be applied to other interpreted programming systems and environments other than Java. The embodiment was chosen and described in order to best explain the principles of the invention the practical application and to enable others of ordinary skill in the art to understand the invention for various embodiments with various modifications as are suited to the particular use contemplated.

It is important to note that while the present invention has been described in the context of a single JVM active in an operating system, there is no constraint to its application to multiple JVMs. Whether for one or several JVMs, the interrupt hook code checks the value of the program counter against the virtual address range for the interpreter. If all JVMs are loaded at the same virtual address for all processes, then the check may employ a global variable; if not, then a global table of process IDs and interpreter address ranges must be maintained. This generalization is well within the means of those with ordinary skill in the art.

What is claimed is:

1. A method in a data processing system for profiling code for processes executing in the data processing system, the method comprising:

recording trace data in response to a selected interrupt, wherein the trace data includes an indication of which code is being interrupted;

processing the trace data to identify whether the interrupted code is interpreted code, and recording a method identification of a method being interpreted in response to an identification that the interrupted code is interpreted code.

2. The method of claim 1 further comprising:

processing the trace data to identify a thread and function executed for each indication.

3. The method of claim 1, wherein the step of recording trace data includes:

recording class block information for a class in response to unloading of the class.

4. The method of claim 1 further comprising:

processing the trace data to obtain information about a current state of the data processing system;

storing the current state of the data processing system in hash tables; and generating a report using the hash tables.

5. The method of claim 4, wherein the trace data are processed while code for processes are executing in the data processing system.

6. The method of claim 4, wherein the trace data are processed after a termination of execution of the code for processes.

7. A method in a data processing system for profiling code for processes executing in the data processing system, the method comprising:

recording trace data in response to a selected interrupt, wherein the trace data includes an indication of which code is being interrupted; and processing the trace data to identify whether the interrupted code is interpreted code, wherein the step of recording trace data includes recording a name of a class and an identification of methods associated with the class in response to loading of the class.

8. A method in a data processing system for profiling code for processes executing in the data processing system, the method comprising:

recording trace data in response to a selected interrupt, wherein the trace data includes an indication of which code is being interrupted;

processing the trace data to identify whether the interrupted code is interpreted code;

processing the trace data to obtain information about a current state of the data processing system;

storing the current state of the data processing system in hash tables; and generating a report using the hash tables, wherein the processing of trace records identifies dynamic loading and unloading of code.

9. A data processing system for profiling code for processes executing in the data processing system, the data processing system comprising:

first recording means for recording trace data in response to a selected interrupt, wherein the trace data includes an indication of which code is being interrupted;

processing means for processing the trace data to identify whether the interrupted code is interpreted code; and second recording means for recording a method identification of a method being interpreted in response to an identification that the interrupted code is interpreted code.

10. The data processing system of claim 9, wherein the processing means is a first processing means and further comprising:

second processing means for processing the trace data to identify a thread and function executed for each indication.

11. The data processing system of claim 9, wherein the recording means includes:

first recording means for recording class block information for a class in response to unloading of the class.

12. The data processing system of claim 9, wherein the processing means is a first processing means and further comprising:

second processing means for processing the trace data to obtain information about a current state of the data processing system;

storing means for storing the current state of the data processing system in hash tables; and generating means for generating a report using the hash tables.

13. The data processing system of claim 12, wherein the trace data are processed while code for processes are executing in the data processing system.

14. The data processing system of claim 12, wherein the trace data are processed after a termination of execution of the code for processes.

15. A data processing system for profiling code for processes executing in the data processing system, the data processing system comprising:

recording means for recording trace data in response to a selected interrupt wherein the trace data includes an indication of which code is being interrupted; and processing means for processing the trace data to identify whether the interrupted code is interpreted code, wherein the recording means includes means for recording a name of a class and an identification of methods associated with the class in response to loading of the class.

16. A data processing system for profiling code for processes executing in the data processing system, the data processing system comprising:

recording means for recording trace data in response to a selected interrupt, wherein the trace data includes an indication of which code is being interrupted;

first processing means for processing the trace data to identify whether the interrupted code is interpreted code;

second processing means for processing the trace data to obtain information about a current state of the data processing system;

storing means for storing the current state of the data processing system in hash tables; and generating means for generating a report using the hash tables, wherein the processing of trace records identifies dynamic loading and unloading of code.

17. A computer program product in a computer readable medium for profiling code for processes executing in a data processing system, the computer program product comprising:

first instructions for recording trace data in response to a selected interrupt, wherein the trace data includes an indication of which code is being interrupted;

second instructions for processing the trace data to identify whether the interrupted code is interpreted code; and third instructions for recording a name of a class and an identification of methods associated with the class in response to loading of a class.

18. The computer program product of claim 17 further comprising:

fourth instructions for processing the trace data to identify a thread and function executed for each indication.

19. The computer program product of claim 17 further comprising:

fourth instructions for processing the trace records to obtain information about a current state of the data processing system;

fifth instructions for storing the current state of the data processing system in hash tables; and sixth instructions for generating a report using the hash tables.

20. A computer program product in a computer readable medium for profiling code for processes executing in the data processing system, the method comprising:

first instructions for recording trace data in response to a selected interrupt, wherein the trace data includes an indication of which code is being interrupted; and second instructions for processing the trace data to identify whether the interrupted code is interpreted code, wherein the first instructions include instructions for recording a name of a class and an identification of methods associated with the class in response to loading of the class.

21. A computer program product in a computer readable medium for profiling code for processes executing in the data processing system, the method comprising:

instructions for recording trace data in response to a selected interrupt, wherein the trace data includes an indication of which code is being interrupted; and instructions for processing the trace data to identify whether the interrupted code is interpreted code;

instructions for processing the trace data to obtain information about a current state of the data processing system;

instructions for storing the current state of the data processing system in hash tables; and instructions for generating a report using the hash tables, wherein the processing of trace records identifies dynamic loading and unloading of code.

\* \* \* \* \*

UNITED STATES PATENT AND TRADEMARK OFFICE
CERTIFICATE OF CORRECTION

PATENT NO. : 6,311,325 B1
DATED : October 30, 2001
INVENTOR(S) : Levine et al.

Page 1 of 1

It is certified that error appears in the above-identified patent and that said Letters Patent is hereby corrected as shown below:

Title page,
Item [54], "METHOD AND APPARATUS FOR PROFILING PROCESSES IN A DATA PROCESSING SYSTEM BACKGROUND OF THE INVENTION" should be -- METHOD AND APPARATUS FOR PROFILING PROCESSES IN A DATA PROCESSING SYSTEM --.

Column 1,
Line 5, "METHOD AND APPARATUS FOR PROFILING PROCESSES IN A DATA PROCESSING SYSTEM BACKGROUND OF THE INVENTION" should be -- METHOD AND APPARATUS FOR PROFILING PROCESSES IN A DATA PROCESSING SYSTEM --.

Signed and Sealed this

Nineteenth Day of March, 2002

Attest:

Attesting Officer

JAMES E. ROGAN
Director of the United States Patent and Trademark Office